US012100413B2

(12) United States Patent
Ono et al.

(10) Patent No.: US 12,100,413 B2
(45) Date of Patent: Sep. 24, 2024

(54) SOUND SOURCE SEPARATION PROGRAM, SOUND SOURCE SEPARATION METHOD, AND SOUND SOURCE SEPARATION DEVICE

(71) Applicant: Tokyo Metropolitan Public University Corporation, Tokyo (JP)

(72) Inventors: Nobutaka Ono, Tokyo (JP); Robin Scheibler, Tokyo (JP)

(73) Assignee: Tokyo Metropolitan Public University Corporation, Tokyo (JP)

( * ) Notice: Subject to any disclaimer, the term of this patent is extended or adjusted under 35 U.S.C. 154(b) by 134 days.

(21) Appl. No.: 17/801,614

(22) PCT Filed: Feb. 26, 2021

(86) PCT No.: PCT/JP2021/007398

§ 371 (c)(1),
(2) Date: Aug. 23, 2022

(87) PCT Pub. No.: WO2021/172524

PCT Pub. Date: Sep. 2, 2021

(65) Prior Publication Data

US 2023/0077621 A1 Mar. 16, 2023

Related U.S. Application Data

(60) Provisional application No. 62/982,755, filed on Feb. 28, 2020.

(51) Int. Cl.
*H04R 3/00* (2006.01)
*G10L 21/0272* (2013.01)
(Continued)

(52) U.S. Cl.
CPC ........ *G10L 21/028* (2013.01); *G10L 21/0272* (2013.01); *H04R 1/406* (2013.01); *H04R 3/005* (2013.01)

(58) Field of Classification Search
CPC ..... H04R 2410/05; G10L 21/02; G10L 19/00; G10L 21/028; G10L 3/005; G10L 21/0208; G10L 25/84
(Continued)

(56) References Cited

U.S. PATENT DOCUMENTS 9,123,348 B2 * 9/2015 Yamada .............. G10L 21/0272
11,354,536 B2 * 6/2022 Betts ...................... H04R 3/005
(Continued)

FOREIGN PATENT DOCUMENTS

JP 2014-41308 A 3/2014

OTHER PUBLICATIONS

N. Ono et al., "Auxiliary-Function-Based Independent Component Analysis for Super-Gaussian Sources", Proc. LVA/ICA, vol. 6365, No. 6, pp. 165-172, Sep. 2010.
(Continued)

*Primary Examiner* — Disler Paul
(74) *Attorney, Agent, or Firm* — Blank Rome LLP

(57) ABSTRACT

A sound source separation program causes a computer to acquire an acoustic signal, convert the acquired acoustic signal from a time region to a frequency region, and perform sound source separation on the acoustic signal converted to the frequency region by performing updating based on elementary row operation on a demixing matrix to iteratively minimize an objective function including a quadratic form of a separation vector and a determinant of the demixing matrix.

5 Claims, 8 Drawing Sheets

(51) Int. Cl.
*G10L 21/028* (2013.01)
*H04R 1/40* (2006.01)

(58) Field of Classification Search
USPC ................ 381/66, 91.1, 94.7, 94.1; 704/233, 704/226–228
See application file for complete search history.

(56) References Cited

U.S. PATENT DOCUMENTS

| | | | | |
|---|---|---|---|---|
| 2013/0010968 | A1* | 1/2013 | Yagi ...................... | G10L 21/028 381/17 |
| 2014/0058736 | A1 | 2/2014 | Taniguchi et al. | |

OTHER PUBLICATIONS

N. Ono, "Stable and Fast Update Rules for Independent Vector Analysis Based on Auxiliary Function Technique", Proc. IEEE Waspaa, New Paltz, NY USA, pp. 189-192, Oct. 2011.
N. Ono, "Optimization Algorithm Based on Auxiliary Function Technique and its Applications to Acoustic Signal Processing." Acoustical Society of Japan, vol. 68, No. 11, pp. 566-571, 2012.
N. Ono et al., "Blind Source Separation Based on Rank-1 Update of Demixing Matrix." Lecture proceedings of Acoustical Society of Japan, pp. 207-208, Mar. 2020.
N. Makishima et al., "Column-Wise Update Algorithm for Independent Deeply Learned Matrix Analysis." Proceedings of the 23rd International Congress on Acoustics, pp. 2805-2812, Sep. 2019.
International Search Report for PCT/JP2021/007398, mailed May 11, 2021.

* cited by examiner

FIG. 5

Start from source estimates $\mathbf{y}_{kn}$ (e.g. mic. signal $\mathbf{x}_{fn}$)

for *loop* $\leftarrow$ 1 to *max. iterations* do

$r_{kn} \leftarrow \sqrt{\sum_f |y_{kfn}|^2}, \ \forall k, n$ for $k \leftarrow 1$ to $M$ do for $f \leftarrow 1$ to $F$ do

$v_{mk} \leftarrow \frac{\sum_n \varphi(r_{mn}) y_{mfn} y^*_{kfn}}{\sum_n \varphi(r_{mn}) |y_{kfn}|^2}, \ \forall m \neq k$ $v_{kk} = 1 - \left(\sum_n \varphi(r_{kn}) |y_{kfn}|^2\right)^{-\frac{1}{2}}$ $\mathbf{y}_{fn} \leftarrow \mathbf{y}_{fn} - \mathbf{v}_k y_{kfn}, \ \forall n$ g201 (loop over iterations), g202 (loop over $k$), g203 (loop over $f$)

FIG. 6

Start from source estimates $y_{fkn}$ (e.g. mic. signal)

for *loop* $\leftarrow 1$ to *max. iterations* do

- $r_{kn} \leftarrow \sqrt{\sum_f |y_{kfn}|^2},\ \forall k, n$
- for $k \leftarrow 1$ to $M$ do
    - for $f \leftarrow 1$ to $F$ do
        - $\mathbf{V}_{kf} \leftarrow \frac{1}{N} \sum_n \varphi(r_{kn}) \mathbf{x}_{fn} \mathbf{x}_{fn}^H$
        - $\mathbf{w}_{kf} \leftarrow (\mathbf{W}_f \mathbf{V}_{kf})^{-1} \mathbf{e}_k$
        - $\mathbf{w}_{kf} \leftarrow \frac{\mathbf{w}_{kf}}{\sqrt{\mathbf{w}_{kf}^H \mathbf{V}_{kf} \mathbf{w}_{kf}}}$
        - $y_{kfn} \leftarrow \mathbf{w}_{kf}^H \mathbf{x}_{fn},\ \forall n$ g901 (body of the loop over iterations), g902 (body of the loop over $k$), g903 (body of the loop over $f$)

SOUND SOURCE SEPARATION PROGRAM, SOUND SOURCE SEPARATION METHOD, AND SOUND SOURCE SEPARATION DEVICE

The present application claims priority based on U.S. Provisional Application No. 62/982,755, filed on Feb. 28, 2020, the contents of which are incorporated herein by reference.

BACKGROUND OF THE INVENTION

Field of the Invention

The present invention relates to a sound source separation program, a sound source separation method, and a sound source separation device.

Description of Related Art

In many cases, signals collected by a microphone include a mixed signal in which a sound source signal and a noise signal are mixed. A technique of blind sound source separation is known as a method of estimating a sound source signal for such a mixed signal without prior information such as a sound source draft. In the blind sound source separation, a sound source is separated using a demixing matrix W for a mixed signal. Here, in a case where the number of sound sources is N and the number of microphones is M, the demixing matrix W is a matrix of N rows by M columns. Here, an observed signal x is represented by a product of a sound source s before mixing and a mixing matrix A. In addition, the demixing matrix W is an inverse matrix $A^{-1}$ of the mixing matrix A. Examples of a technique for obtaining the demixing matrix W include independent component analysis (ICA) and independent vector analysis (IVA).

Further, as a technique for performing blind sound source separation, auxiliary function type independent component analysis (AuxICA; see, for example, N. Ono et al., "Auxiliary-function-based independent component analysis for super-Gaussian sources", Proc. LVA/ICA, Vol. 6365, No. 6, pp. 165-172, September 2010) and auxiliary function type independent vector analysis (AuxIVA; see, for example, N. Ono, "Stable and fast update rules for independent vector analysis based on auxiliary function technique", in Proc. IEEE WASPAA, New Paltz, NY, USA, October 2011, pp. 189-192) and the like that use an auxiliary function and have been proposed in recent years.

In AuxIVA, a demixing matrix is estimated by iteratively minimizing an auxiliary function Q of the following Formula (1). Note that, in a mathematical formula, a bold uppercase letter represents a matrix, a bold lowercase variable represents a vector, and an ordinary lowercase variable represents a scalar.

$$Q = \sum_{f=1}^{F}\sum_{k=1}^{M} w_{kf}^{H} V_{kf} w_{kf} - 2\sum_{f=1}^{F}\log|\det(W_f)| \tag{1}$$

In Formula (1), k is an index of a sound source signal, f is an index representing a frequency, and F is a total number of frequencies. $W_f=(w_{1f} \ldots w_{Kf})^H$ is a demixing matrix to be estimated, M is the number of sound sources (=the number of microphones), and H is the Hermitian transpose. Further, $V_{kf}$ is a semi-positive definite matrix calculated by a method different depending on a technique, such as ICA and IVA. Since it is not easy to minimize Formula (1) with respect to the demixing matrix $W_f$, in AuxIVA, row vectors are updated one by one by using update formulas of the following Formulas (2) and (3).

$$w_{kf} \leftarrow (W_f V_{kf})^{-1} e_k \tag{2}$$

$$w_{kf} \leftarrow \frac{w_{kf}}{\sqrt{w_{kf}^{H} V_{kf} w_{kf}}} \tag{3}$$

Note that, in Formula (2), $V_{kf}$ is shown in the following Formula (4).

$$V_{kf} = \frac{1}{N}\sum_{n=1}^{N}\varphi(r_{kn}) x_{fn} x_{fn}^{H} \tag{4}$$

Here, $e_m$ is a K-dimensional unit vector in which only an mth element is 1, and the other elements are 0. Here, this technique is referred to as iterative projection (IP).

SUMMARY OF THE INVENTION

However, in a technique of the related art such as IP, there is a problem that calculation costs of an inverse matrix operation in Formula (2) increase as the number of microphones increases.

The present invention is contrived in view of the above-described problems, and an object thereof is to provide a sound source separation program, a sound source separation method, and a sound source separation device which are capable of separating sound sources at high speed without calculating an inverse matrix.

In order to achieve the above-mentioned object, a sound source separation program according to an aspect of the present invention causes a computer to acquire an acoustic signal, convert the acquired acoustic signal from a time region to a frequency region, and perform sound source separation on the acoustic signal converted to the frequency region by performing updating based on elementary row operation on a demixing matrix to iteratively minimize an objective function including a quadratic form of a separation vector and a determinant of the demixing matrix.

Further, in the sound source separation program according to the aspect of the present invention, the program causes the computer to perform updating by a conversion formula based on the elementary row operation of the following formula for each frequency f and when k=1, . . . , M, and $$W_f \leftarrow W_f - v_{kf} w_{kf}^{H}$$

solve an unknown vector $v_{kf}=(v_1, \ldots, v_M)^T$ (T represents vector transpose, k is a number of a sound source signal and is an integer from 1 to the number of microphones M, and f is an index representing a frequency) using the function, where $W_f=(w_{1f}, \ldots, w_{Kf})^H$ is a demixing matrix, H is the Hermitian transpose, K is the number of sound sources, M is the number of microphones that collect the acoustic signal, and K=M.

Further, in the sound source separation program according to the aspect of the present invention, the program may cause the computer to perform updating by multiplying the demixing matrix $W_f$ by a matrix in which a kth column is determined so as to minimize the function and other columns other than the kth column are unit columns, for each frequency f and repeat the updating processing to obtain the demixing matrix $W_f$.

Further, in the sound source separation program according to the aspect of the present invention, the function may be shown in the following formula, $$Q=\sum_{f=1}^{F}\sum_{k=1}^{M}w_{kf}^{H}V_{kf}w_{kf}-2\sum_{f=1}^{F}\log|\det(W_f)|$$

the demixing matrix $W_f$ may be $(w_{1f} \ldots w_{K})^H$, F may be a total number of frequencies, H may be the Hermitian transpose, and $V_{kf}$ may be the weighted covariance matrix.

In order to achieve the above-mentioned object, a sound source separation method according to an aspect of the present invention includes acquiring an acoustic signal by a sound collecting unit including a plurality of microphones, converting the acquired acoustic signal from a time region to a frequency region by a sound separation unit, and performing sound separation on the acoustic signal converted to the frequency region by the sound source separation unit, the sound separation being performed by performing updating based on elementary row operation on a demixing matrix to iteratively minimize an objective function including a quadratic form of a separation vector and a determinant of the demixing matrix.

In order to achieve the above-mentioned object, a sound source separation device according to an aspect of the present invention includes a sound collecting unit that includes a plurality of microphones that acquire an acoustic signal, and a sound source separation unit that converts the acquired acoustic signal from a time region to a frequency region, and performs sound source separation on the acoustic signal converted to the frequency region by performing updating based on elementary row operation on a demixing matrix to iteratively minimize an objective function including a quadratic form of a separation vector and a determinant of the demixing matrix.

According to the present invention, it is possible to separate sound sources at high speed without calculating an inverse matrix.

BRIEF DESCRIPTION OF THE DRAWINGS

FIG. 5 is a diagram illustrating an example of an ISS algorithm of sound source separation according to the embodiment.

FIG. 6 is a diagram illustrating an IP algorithm according to a comparative example.

DETAILED DESCRIPTION OF THE INVENTION

Hereinafter, an embodiment of the present invention will be described with reference to the drawings.

Outline

Figure 1:
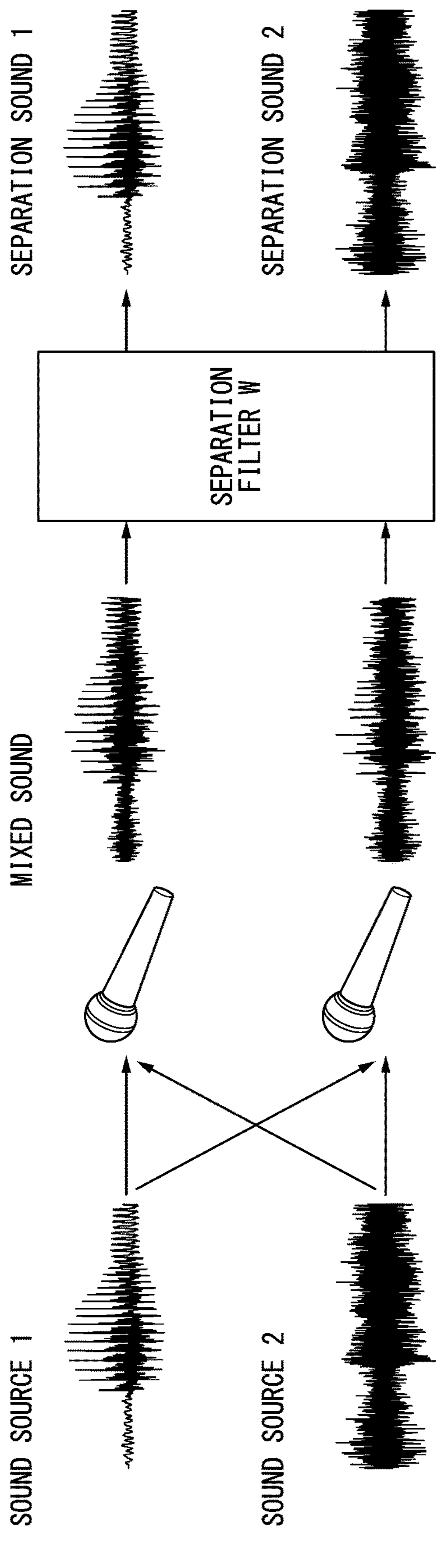
FIG. 1 is a diagram illustrating an outline of blind sound source separation processing.

First, an outline of an embodiment will be described. FIG. 1 is a diagram illustrating an outline of blind sound source separation processing. As illustrated in FIG. 1, in blind sound source separation, a separation sound is separated from a mixed sound using a separation filter (demixing matrix) W. In the present embodiment, the calculation of the demixing matrix W is performed by updating a rank of a matrix by 1 instead of performing updating for each row vector. Thereby, in the present embodiment, it is possible to realize a further increase in the speed of the blind sound source separation.

Configuration Example of Sound Source Separation Device

Next, a configuration example of a sound source separation device will be described.

Figure 2:
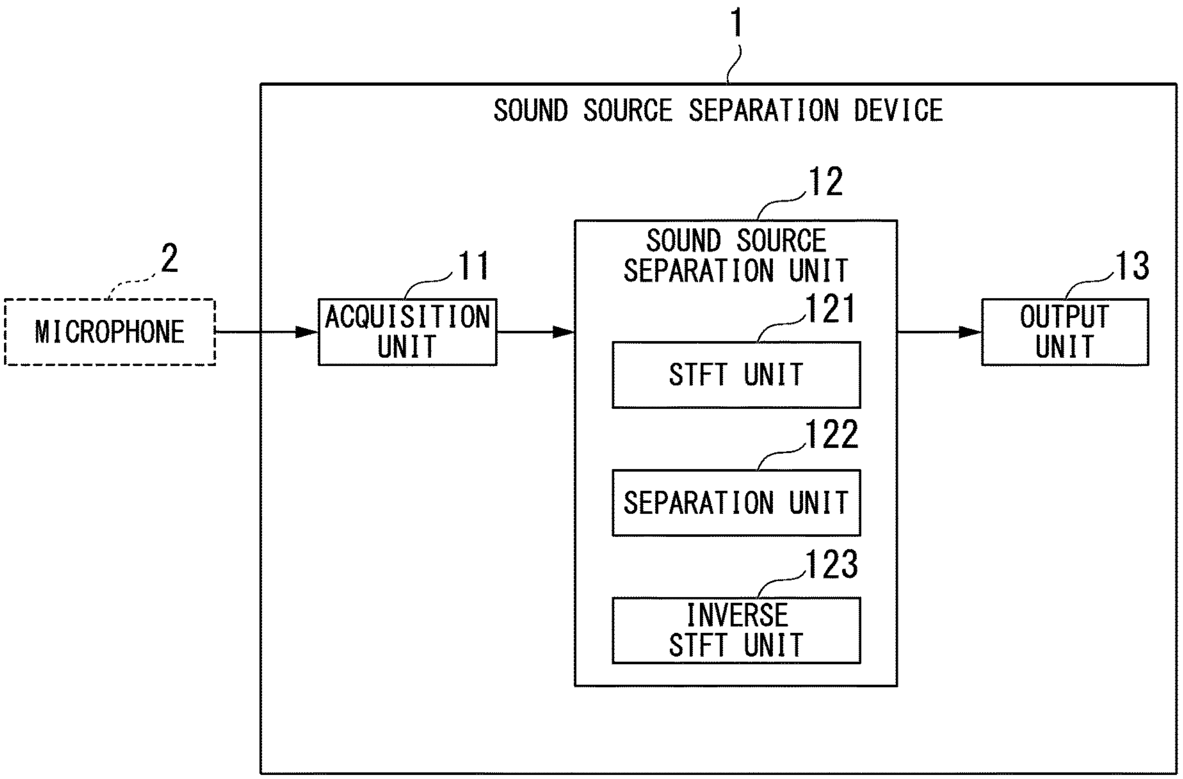
FIG. 2 is a diagram illustrating an example of a configuration of a sound source separation device according to an embodiment.

FIG. 2 is a diagram illustrating an example of a configuration of a sound source separation device 1 according to the present embodiment. As illustrated in FIG. 2, the sound source separation device 1 includes an acquisition unit 11, a sound source separation unit 12, and an output unit 13.

The sound source separation unit 12 includes an STFT unit 121, a separation unit 122, and an inverse STFT unit 123.

Operations of Sound Source Separation Device

Next, operations of the sound source separation device 1 will be described with reference to FIG. 1.

The sound source separation device 1 separates a sound source signal from a mixed signal collected by a microphone 2 (sound collecting unit). Note that, the microphone 2 is a microphone array constituted by a plurality of microphones.

The acquisition unit 11 acquires a mixed signal (acoustic signal) output by the microphone 2. The acquisition unit 11 converts the mixed signal from an analog signal to a digital signal and outputs the converted signal to the sound source separation unit 12.

The sound source separation unit 12 may be, for example, a personal computer, a central processing unit (CPU), a digital signal processing unit (DSP), an integrated circuit for a specific application (ASIC), or the like.

The STFT unit 121 converts the mixed signal output by the acquisition unit 11 from a time region to a frequency region by short-time Fourier transform.

The separation unit 122 performs sound source separation by iteratively minimizing an auxiliary function instead of the demixing matrix W for the mixed signal having been subjected to the short-time Fourier transform. Note that the auxiliary function, a processing algorithm, and the like will be described later.

The inverse STFT unit 123 converts a sound source signal in the frequency region which is separated by the separation unit 122 from the frequency region to the time region by inverse short-time Fourier transform.

The output unit 13 outputs the sound source signal separated by the sound source separation unit 12 to an external device (for example, a speaker).

Example of Signal Processing

Next, an example of signal processing in the sound source separation device will be described.

Note that, in the following example, AuxIVA (auxiliary function type independent vector analysis) will be described as an example, but the present invention is not limited thereto. An update rule of a demixing matrix in the embodiment can also be applied to auxiliary function type independent component analysis (AuxICA), independent low-rank matrix analysis (ILRMA), and the like.

A mixed sound in which K sound sources collected by M microphones are mixed can be represented as the following Formula (5). Note that, in the mathematical formulas used in the embodiment, bold uppercase letters represent matrices, bold lowercase variables represent vectors, and ordinary lowercase variables represent scalars.

$$\hat{x}_m[t] = \sum_{k=1}^{K} (\hat{a}_{mk} \star \hat{s}_k)[t] \tag{5}$$

In Formula (5), $x\hat{}_m[t]$ is a signal of an mth microphone, $s\hat{}_k[t]$ is a kth sound source signal, and $a\hat{}_{mk}[t]$ is impulse responses of the microphone signal and the sound source signal. In addition, a star mark represents a convolution operation. In a time frequency region, convolution is a product for each frequency and is as shown in the following Formula (6).

$$x_{mfn} = \sum_{k=1}^{K} a_{mkf} s_{kfn} \tag{6}$$

In Formula (6), $x_{mfn}$ is obtained by performing short-time Fourier transform on $x\hat{}_m[t]$, $s_{kfn}$ is obtained by performing short-time Fourier transform on $s\hat{}_k[t]$, and $a_{mk}[f]$ is obtained by performing discrete Fourier transform on $a\hat{}_{mk}[t]$. f (=1, . . . , F) is a discrete frequency bin, and n (=1, . . . , N) is a frequency index. Note that Formula (6) is an approximate value that is effective when the Fourier transform is sufficiently longer than the impulse response. When a microphone signal and a sound source signal at a frequency f are grouped by a vector, the microphone signal can be represented as a linear mixture of the sound source signals as shown in the following Formula (7).

$$x_{fn} = A_f s_{fn} \tag{7}$$

In Formula (7), $A_f$ is a mixing matrix according to $(A_f)_{mk} = a_{mkf}$.

The purpose of the independent vector analysis (IVA) is to obtain a demixing matrix $W_f$ $(=[w_{1f}, \ldots, w_{Mf}]^H)$ in the following Formula (8).

$$y_{fn} = W_f x_{fn} \tag{8}$$

In Formula (8), $y_{fn}$ is a separation signal. In IVA, it is assumed that an information source is statistically independent, and it is assumed that a distribution of a sound source signal is a spherical super Gaussian distribution $(p(s_{k1n}, \ldots, S_{kFn})$ to $e^{-G}(\sqrt{}(\Sigma_f s_{kfn}))$, where G is, for example, a Laplace function $G(r)=r$ or a Cauchy function $G(r)=-\log(1+r^2/v)$). In AuxIVA, a demixing matrix is estimated by iteratively minimizing the auxiliary function Q in the following Formula (9) under these assumptions.

$$Q = \sum_{f=1}^{F} \sum_{k=1}^{M} w_{kf}^H V_{kf} w_{kf} - 2\sum_{f=1}^{F} \log|\det(W_f)| \tag{9}$$

In other words, Formula (9) is a function consisting of a quadratic form of a separation vector (first term) and a determinant of a demixing matrix (second term). Note that, Formula (9) may include other terms. Further, the second term in Formula (9) is not limited to a logarithm of the determinant and may be other forms.

Further, in Formula (9), $V_{kf}$ is shown in the following Formula (10).

$$V_{kf} = \frac{1}{N} \sum_{n=1}^{N} \varphi(r_{mn}) x_{fn} x_{fn}^H \tag{10}$$

Further, in Formula (10), φ(r) is a non-linear function determined depending on a sound source model, for example, φ(r)=1/r. Further, $r_{kn}$ is shown in the following Formula (11):

$$r_{kn} = \sqrt{\sum_{f=1}^{F} |w_{kf}^H x_{fn}|^2} \tag{11}$$

In AuxIVA and the like of the related art, row vectors are updated one by one by using the following Formulas (12) and (13). In the following description, such a technique is referred to as iterative projection (IP).

$$w_{kf} \leftarrow (W_f V_{kf})^{-1} e_k \tag{12}$$

$$w_{kf} \leftarrow \frac{w_{kf}}{\sqrt{w_{kf}^H V_{kf} w_{kf}}} \tag{13}$$

In such an IP method, calculation costs of an inverse matrix operation in Formula (12) increase as the number of microphones increases.

ISS Technique of the Present Embodiment

Next, a technique of the present embodiment will be described. Note that the technique of the present embodiment is also referred to as iterative source steering (ISS).

In the present embodiment, instead of updating the demixing matrix W for each row vector, the demixing matrix W is obtained by performing updating based elementary row operation as in the following Formula (14). Note that, in the updating based on the elementary row operation, processing is repeated for each frequency f and when k=1, . . . , M.

$$W_f \leftarrow W_f - v_{kf} w_{kf}^H \tag{14}$$

In Formula (14), $v_{kf}$ $(=(v_{1kf}, \ldots, v_{Mkf})^T$ (T represents transpose)) is an unknown vector to be calculated.

Figure 3:
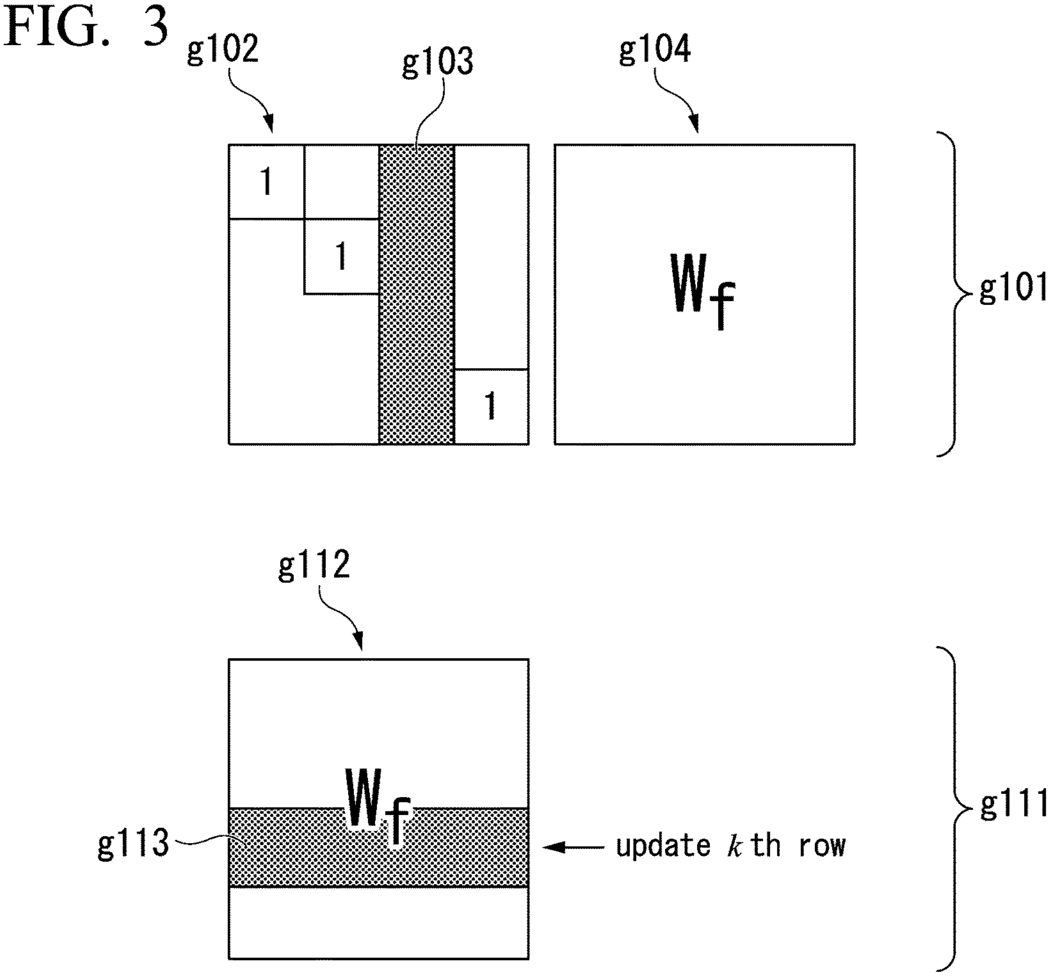
FIG. 3 is a diagram illustrating updating according to elementary row operation.

FIG. 3 is a diagram illustrating updating according to elementary row operation. A region indicated by g101 is a diagram illustrating updating according to an ISS technique of the present embodiment. In the embodiment, updating according to elementary row operation is performed by multiplying a demixing matrix $W_f$ (g103) by a matrix, which is a diagonal matrix (g102), from the left except for a kth column (g103).

A region indicated by g111 is a diagram illustrating updating according to an IP technique of the related art. In the IP technique of the related art, a kth row (g113) of the demixing matrix is updated.

The calculation of the unknown vector vu in Formula (14) can be performed by finding vu for minimizing an auxiliary function $Q(v_{kf})$ in the following Formula (15).

$$Q(v_{kf}) = -2\sum_{f=1}^{F}\log\left|\det\left(W_f - v_{kf}w_{kf}^H\right)\right| + \sum_{f=1}^{F}\sum_{m=1}^{M}\left(w_{mf} - v_{mkf}^* w_{kf}\right)^H V_{mf}\left(w_{mf} - v_{mkf}^* w_{kf}\right) \quad (15)$$

When f is omitted in Formula (15), the following Formula (16) is obtained.

$$Q(v_k) = \sum_{m=1}^{M}(w_m - v_{mk}^* w_k)^H V_m (w_m - v_{mk}^* w_k) - 2\log\left|\det\left(W - v_k w_k^H\right)\right| \quad (16)$$

In Formula (16), $V_m$ is shown in the following Formula (17).

$$V_m = \frac{1}{N}\sum_{n=1}^{N}\varphi(r_{mn})x_n x_n^H \quad (17)$$

In Formulas (15) and (16), an asterisk * represents a complex conjugate.

Note that, the auxiliary function Q can be divided into contributions for each frequency f, and thus a frequency index f is omitted in the following description. This minimization problem (the following Formula (18)) can be solved as in the following Formula (19). Note that C in Formula (18) is a set of all complex numbers.

$$v_k = [v_{1k}, \ldots, v_{Mk}]^T = \arg\min_{v\in\mathbb{C}^M} Q(v) \quad (18)$$

$$v_{mk} = \begin{cases} \dfrac{w_m^H V_m w_k}{w_k^H V_m w_k} & \text{if } m \neq k \\ 1 - \left(w_m^H V_m w_k\right)^{-\frac{1}{2}} & \text{if } m = k \end{cases} \quad (19)$$

In a case where f is not omitted, the following Formula (20) is obtained.

$$v_{mkf} = \begin{cases} \dfrac{w_{mf}^H V_{mf} w_{kf}}{w_{kf}^H V_{mf} w_{kf}} & \text{if } m \neq k \\ 1 - \left(w_{mf}^H V_{mf} w_{kf}\right)^{-\frac{1}{2}} & \text{if } m = k \end{cases} \quad (20)$$

Here, when a theorem regarding a determinant of a matrix is applied, the following Formula (21) is obtained.

$$\det(W - v_k w_k^H)\det(W)(1 - e_k^T v_k) \quad (21)$$

When a constant term is omitted in Formula (16), the auxiliary function Q can be simplified as in the following Formula (22).

$$-2\log|1 - v_{kk}| + \sum_m (w_{mf} - v_{mk}^* w_k)^H V_m (w_m - v_{mk}^* w_k) \quad (22)$$

When a complex differential is taken for $v^*_{mk}$, the following Formula (23) is obtained.

$$\frac{\partial Q}{\partial v_{mk}^*} = \begin{cases} -w_m^H V_m w_k + v_{mk} w_k^H V_m w_k & \text{if } m \neq k \\ \dfrac{1}{1 - (v_{kk})^*} - (1 - v_{kk}) w_k^H V_k w_k & \text{if } m = k \end{cases} \quad (23)$$

A desired result is obtained by equalizing Formula (23) to zero. This updating formula does not include an inverse matrix operation. In addition, when focusing on $y_{kn}=w^H_k x_n$, an amount required for updating is only the following Formulas (24) and (25). Note that $\varphi(r_{mn})$ is a non-linear function determined depending on a sound source model.

$$w_m^H V_m w_k = w_m^H\left(\sum_n \varphi(r_{mn})x_n x_n^H\right)w_k = \frac{1}{N}\sum_n \varphi(r_{mn})y_{mn}y_{kn}^* \quad (24)$$

$$w_h^H V_m w_k = \frac{1}{N}\sum_n \varphi(r_{mn})|y_{kn}|^2 \quad (25)$$

In a case where f is not omitted in Formulas (24) and (25), the following Formulas (26) and (27) are obtained.

$$w_{mf}^H V_{mf} w_{kf} = \frac{1}{N}\sum_n \varphi(r_{mn})y_{mfn}y_{knf}^* \quad (26)$$

$$w_{kf}^H V_{kf} w_{kf} = \frac{1}{N}\sum_n \varphi(r_{mn})|y_{kfn}|^2 \quad (27)$$

In the present embodiment, it is possible to efficiently perform calculation as shown in the right side of Formulas (24) and (25) without obtaining all of the elements of $V_m$. Further, since $y_n$ is required for the calculation of the right side, it is only required that the following Formula (28) is updated in the present embodiment.

$$y_n \leftarrow (W - v_k w_k^H)x_n = y_n - v_k y_{kn} \quad (28)$$

In a case where f is not omitted in Formula (28), the following Formula (29) is obtained.

$$y_{nf} \leftarrow (W_f - v_{kf} w_{kf}^H)x_{nf} = y_{nf} - v_{kf} y_{knf} \quad (29)$$

Since these amounts are required for m and each requires N arithmetic operations, a total degree of complexity for each updating is O (MN). Note that, in every K updates, all of $V_k$ are required, and all demodulation filters need to be changed. On the other hand, in the present embodiment, it is sufficient to update $r_{kn}$ only once for each iteration.

Here, an outline of an auxiliary coefficient method using an auxiliary function is described.

Here, a minimization problem for a function $J(\theta)$ ($J(\theta)\rightarrow\min$) will be described as an example. An objective function and an auxiliary function satisfy a relationship of $J(\theta)=\min_\eta Q(\theta, \eta)$. From this relationship, a relationship of the auxiliary function $Q(\theta, \eta)\geq$the objective function $J(\theta)$ is satisfied for any auxiliary variable $\eta$, and there is an auxiliary variable f that satisfies $J(\theta)=Q(\theta, \eta)$ for any parameter $\theta$. Further, in the auxiliary function method, auxiliary functions are minimized alternately for the parameter $\theta$ and the auxiliary variable η by the following Formulas (30) and (31). Note that k is a positive integer representing an iterative rank.

$$\eta^{(k+1)} = \arg\min_{\eta} Q(\theta^{(k)}, \eta) \tag{30}$$

$$\theta^{(k+1)} = \arg\min_{\theta} Q(\theta, \eta^{(k+1)}) \tag{31}$$

FIG. 3 is a diagram illustrating an outline of an auxiliary coefficient method using an auxiliary function. In FIG. 3, the horizontal axis is a parameter θ.

Formula (26) is an operation for calculating an auxiliary function $Q(\theta, \eta^{(k+1)})$ that becomes equal to an objective function $J(\theta)$ by the current estimated value $\theta=\theta^{(k)}$. In addition, Formula (27) is an operation for minimizing the auxiliary function Q $(\theta, \eta^{(k+1)})$. In addition, iteration processing is repeated, and the parameters are updated and minimized as illustrated in FIG. 3. In this manner, the auxiliary function method is an algorithm for iteratively minimizing the auxiliary function $Q(\theta, \eta)$ that satisfies a relationship of $J(\theta)=\min_{\eta} Q(\theta, \eta)$ instead of the objective function $J(\theta)$ (see Junki Ono, "Optimization algorithm based on auxiliary function technique and its applications to acoustic signal processing", Acoustical Society of Japan, Journal of Acoustical Society of Japan, Vol. 68, No. 11, 2012, pp. 566-571).

Explanation of Algorithm

Next, an example of an ISS algorithm for sound source separation of the present embodiment will be described.

FIG. 5 is a diagram illustrating an example of an ISS algorithm for sound source separation according to the present embodiment. A mixed signal to be input is assumed to be $x_{fn}$, and a separation signal is assumed to be $y_{fn}$.

The following processing is repeated from 1 to a maximum value (g201).

$\sqrt{(\Sigma|y_{kfn}|)^2}$ is substituted for $r_{kn}$ for all of k and n.

For k, the processing is repeated from 1 to M (g202).

For f, the following processing is repeated from 1 to F (g203).

$(\Sigma_n \varphi(r_{mn}) y_{mfn} y_{kfn}^*)/(\Sigma_n \varphi(r_{mn})|y_{kfn}|^2)$ is substituted for $v_{km}$ (m=other than k), $1-(\Sigma_n \varphi(r_{mn})|y_{kfn}|^2)^{(-1/2)}$ is substituted for $v_{kk}$, and $y_{fn}-v_k y_{kfn}$ is substituted for $y_{fn}$ for all of n.

Figure 4:
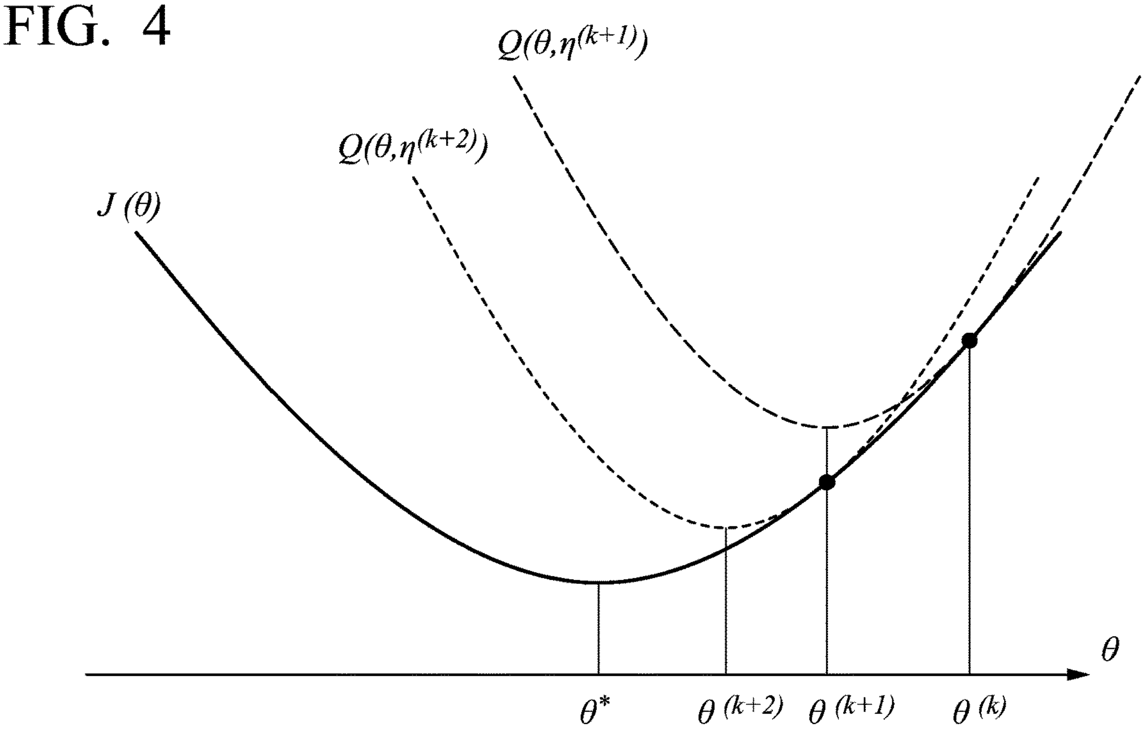
FIG. 4 is a diagram illustrating an outline of an auxiliary coefficient method using an auxiliary function.

As illustrated in FIG. 4, in the present embodiment, there is no procedure of calculating an inverse matrix and no covariance matrix. A calculation amount is $O(FM^2N)$/iteration.

Comparative Example; IP Algorithm

Here, a processing example using the IP algorithm described above will be described.

FIG. 6 is a diagram illustrating an IP algorithm according to a comparative example.

The following processing is repeated from 1 to a maximum value (g901).

$\sqrt{(\Sigma|y_{kfn}|)^2}$ is substituted for $r_{kn}$ for all of k and n.

For k, the processing is repeated from 1 to M (g902).

For f, the following processing is repeated from 1 to F (g903).

$1/N(\Sigma_n \varphi(r_{kn}) x_{fn} x^H_{fn}$ is substituted for $V_{km}$, $(W_f V_{kf})^{-1} e_k$ is substituted for $w_{kf}$, $\{w_{kf}/\sqrt{(x^H_{fn} V_{kf} w_{kf})}$ is substituted for $w_{kf}$, and $x^H_{fn} w_{kf}$ is substituted for $y_{fn}$ for all of n.

Comparison of Calculation Amount Between IP Algorithm and ISS Algorithm

Comparing FIGS. 5 and 6, an IP algorithm includes processing for calculating an inverse matrix of a demixing matrix $W_f$ in the processing of g903. The cost for obtaining such an inverse matrix is $O(M^3)$. In addition, the cost required to calculate a covariance matrix is $O(M^2N)$. A total computation amount of the IP algorithm is $O(FM^3N)$/iteration.

Figure 7:
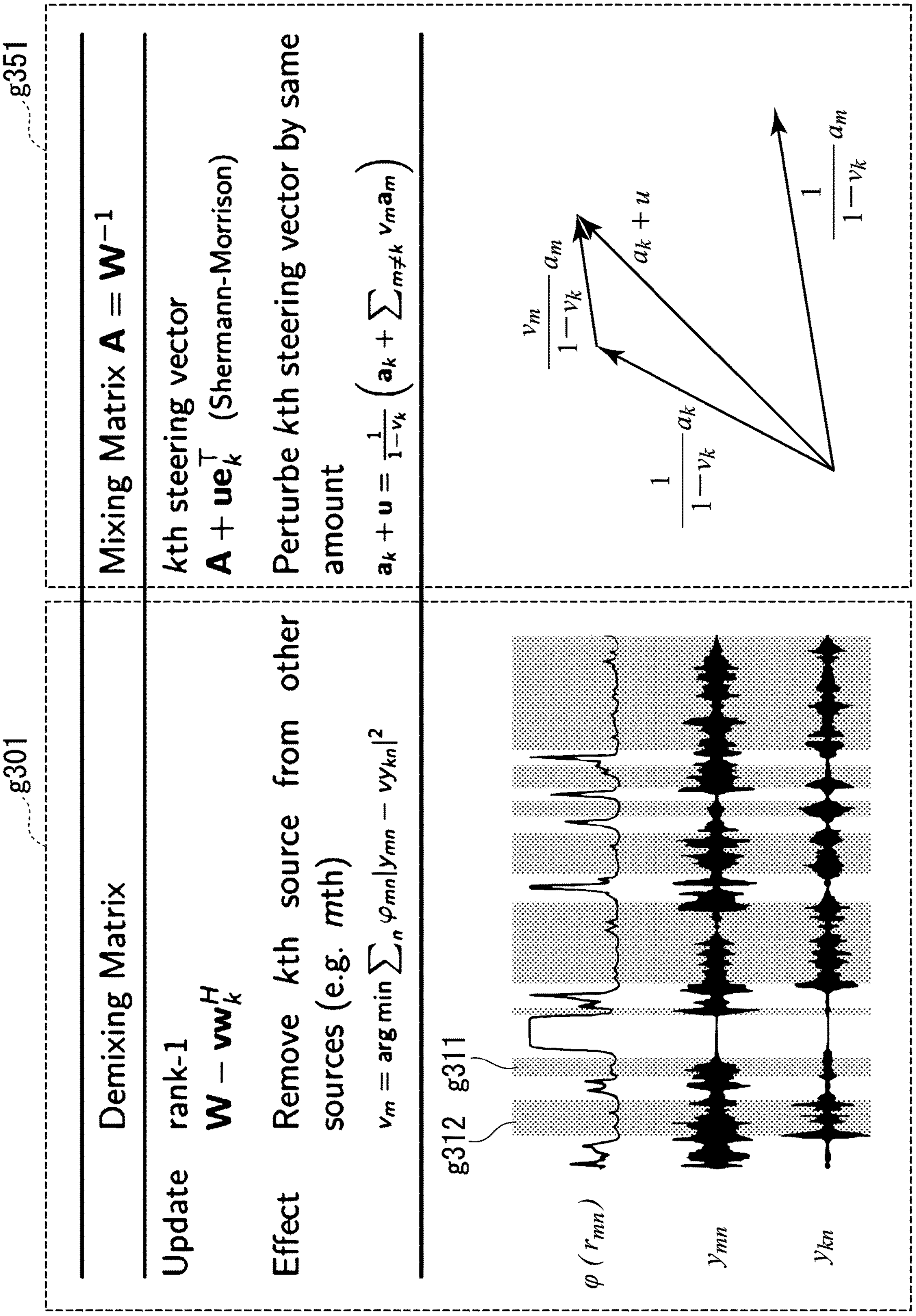
FIG. 7 is a diagram illustrating the efficiency of updating according to the embodiment.

FIG. 7 is a diagram illustrating the efficiency of updating in the present embodiment.

In AuxIVA-IP, a row of a demixing matrix W is updated. On the other hand, in the ISS algorithm of the present embodiment, a column of a mixing matrix, that is, a kth steering vector of $A=W^{-1}$ is updated. In the updating, for example, a Sherman-Morrison technique is used to obtain an approximate inverse matrix. Updating of Formula (14) to $W=A^{-1}$ is equivalent. Processing for changing the kth steering vector by the same amount is performed as in, for example, the following Formula (32). Note that the mixing matrix $A=[a_1, \ldots, a_M]$ is in accordance with a steering vector of a sound source.

$$a_k + u = \frac{1}{1 - v_{kk}}\left(a_k + \sum\nolimits_{m \neq k} v_{mk} a_m\right) \tag{32}$$

Note that the vector $a_k+u$ is the sum of the vector $1/(1-v_{kk})a_k$ and the vector $v_m/(1-v_{kk})a_m$ obtained by multiplying the vector $\{1/(1-v_{kk})\}a_m$ by $v_m$. In addition, $W=A^{-1}$ in the Sherman-Morrison formula, and thus Formula (32) becomes the following Formula (33).

$$\left(A + ue_k^T\right) = W - \frac{Wu}{1 + w_k^H u} w_k^H \tag{33}$$

By making it the same as Formula (14), it can be seen that $v=Wu(1+w^H_k u)^{-1}$ is established.

In Formula (32), the kth steering vector is updated by a weighted sum of steering vectors of the other sources, and thereafter, rescaling is performed. A coefficient $v_{mk}$ when $m \neq k$ is a resultant of projection of noise of an mth sound source estimated value $y_m$ onto a partial space of $y_k$, and is represented as the following Formula (34).

$$v_{mk} = \arg\min_{v} \sum\nolimits_n \varphi_{mn}(r_{mn})|y_{mn} - v y_{kn}|^2 \tag{34}$$

From the nature of $\varphi(r)$, $\varphi(r_{mn})$ decreases when an mth source becomes active and increases when the mth source does not become active. Thus, in the present embodiment, the kth steering vector is modified by an amount proportional to an mth steering vector. Note that, in the present embodiment, scaling is required to maintain the scale of a signal during iterative processing.

By this processing, the signal is separated into, for example, a first signal g311 and another signal g312.

Next, an example of a result of comparison between an IP algorithm and the ISS algorithm of the present embodiment will be described.

The amount of arithmetic operation for updating a kth row of a demixing matrix $W_f$ in the IP algorithm is controlled by either a covariance matrix $V_{kf}$ or a linear system. As described above, the amount of arithmetic operation of the IP algorithm is $O(M^3)$, and the amount of arithmetic operation of the ISS algorithm is $O(M^2N)$.

In the IP algorithm, updating of an Mth row and updating of an F frequency band are repeated, and thus a total calculation amount $C_{IP}$ of one iteration is shown in the following Formula (35), which is at least $O(M^4)$.

$$C_{IP}=O(FM^3\max(M,N)) \tag{35}$$

In the ISS algorithm, when m, k=1, . . . , M, Formulas (19) and (21) are calculated for each iteration. Further, the calculation of $r_{kn}$, $\forall_k$, and n has a calculation amount of O(FMN) for each iteration. Thus, an overall calculation amount $C_{ISS}$ per iteration is shown in the following Formula (36).

$$C_{ISS}=O(FM^2N) \tag{36}$$

However, a calculation amount of the ISS algorithm repeatedly uses a single covariance matrix. In addition, a calculation amount in the case of N=1 as in online processing is a quadratic function of the number of microphones.

Verification Result

Next, results of experiment comparison between the IP algorithm according to the comparative example and the ISS algorithm according to the present embodiment will be described.

First, an experimental environment will be described.

In the experiment, the following simulation was performed using a Python (registered trademark) package.

100 random rectangular rooms with walls between 6 m and 10 m and a ceiling height between 2.8 m and 4.5 m were used.

A reverberation time $T_{60}$, which is a period of time required for a sound energy in the room is set to −60 dB, was set to be in the range of 60 ms to 540 ms.

Figure 8:
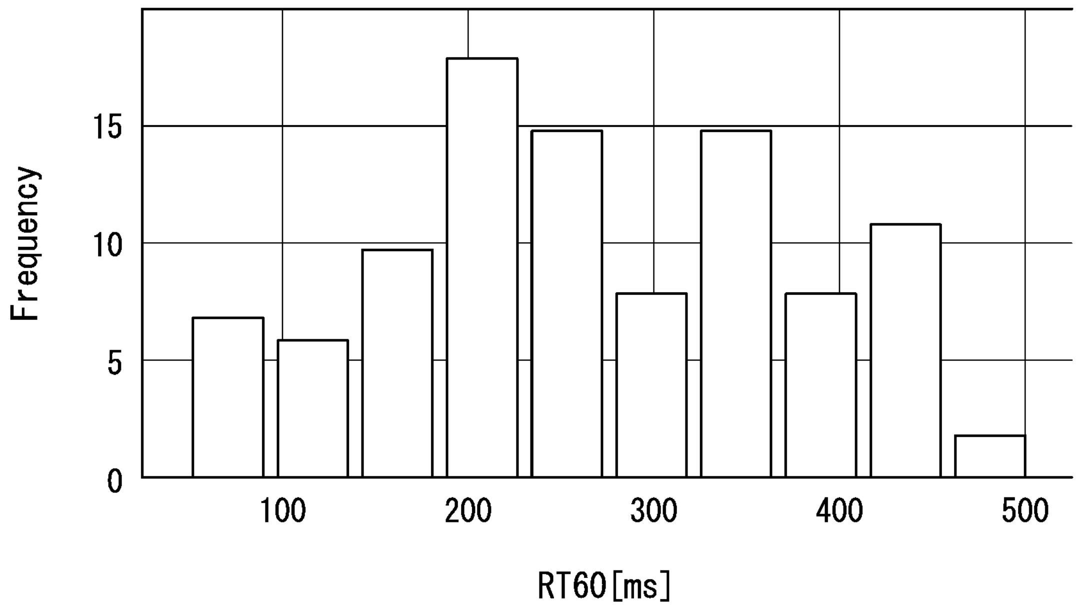
FIG. 8 is a histogram of a reverberation time of a room used in a simulation.

FIG. 8 is a histogram of a reverberation time of the room used in the simulation. The horizontal axis is a reverberation time RT60 ms, and the vertical axis is a frequency kHz.

A sound source and a microphone array were randomly disposed at a position of at least 50 cm and disposed at a height between 1 m and 2 m away from the wall. The microphone array has 10 microphones, has a circular shape with a radius of 3.2 cm, and an interval between the microphones is 2 cm.

Regarding a distance between the sound source and the center of the microphone array, at least a critical distance is $d_{crit}$=0.057 ($V=T_{60}$) m. V is a volumetric room. A first microphone uses a unit power obtained by normalizing a sound source signal.

A definition of SNR=$M/\sigma^2_n$ is given. $\sigma^2_n$ is the dispersion of uncorrelated white noise in the microphone. The SNR was fixed at 30 dB. Separation was performed on 2, 3, 4, 6, 8, and 10 sound sources.

Note that the number of sound sources is equal to or less than the number of microphones. A sampling frequency is 16 kHz, and an STFT frame size is 256 ms, which is a half overlap. A matching window according to a humming window was used for analysis and composition. In the experiment, the AuxIVA-IP algorithm according to the comparative example and the ISS algorithm according to the present embodiment were each repeated 10M times (M is the number of microphones) and separated. After the separation, the output scale was projected onto the first microphone and restored.

Figure 9:
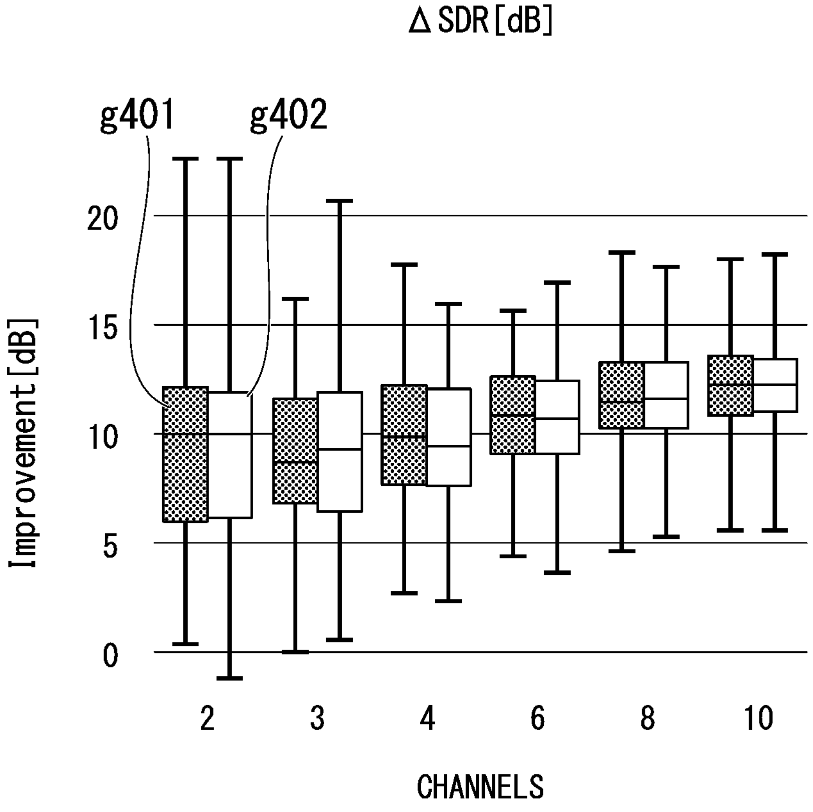
FIG. 9 is a diagram illustrating SDR after 10M repetitions.
Figure 10:
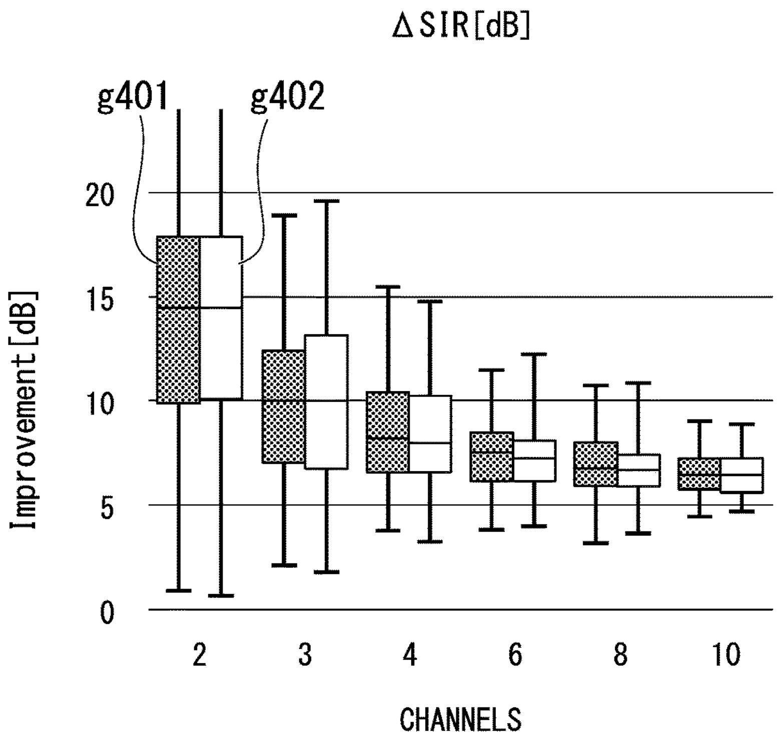
FIG. 10 is a diagram illustrating SIR after 10M repetitions.

A signal distortion ratio SDR and a signal-to-interference ratio SIR were used as evaluation indexes. The SDR and the SIR were measured before and after separation. FIG. 9 is a diagram illustrating an SDR after 10M times repetitions. FIG. 10 is a diagram illustrating an SIR after 10M times repetitions. In FIGS. 9 and 10, the horizontal axis is the number of channels, and the vertical axis is an improvement amount dB. In FIGS. 9 and 10, reference numeral g401 denotes a result of the AuxIVA-IP algorithm according to the comparative example, and reference numeral g402 denotes a result of the ISS algorithm according to the present embodiment. As illustrated in FIGS. 9 and 10, the result using the ISS algorithm according to the present embodiment was equivalent to the result using the AuxIVA-IP algorithm according to the comparative example.

Next, results of comparison between times required for a separation arithmetic operation will be described.

Figure 11:
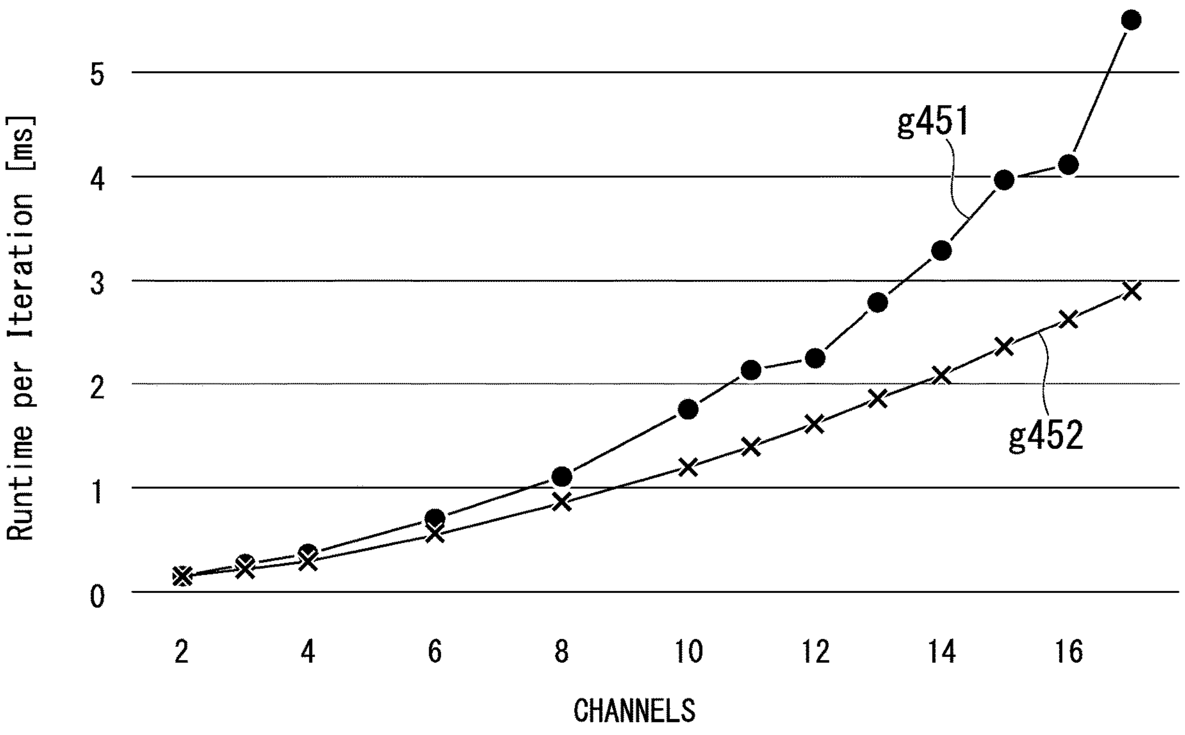
FIG. 11 is a diagram illustrating an arithmetic operation for each repetition.

FIG. 11 is a diagram illustrating an arithmetic operation performed for each repetition. In FIG. 11, the horizontal axis is a channel, and the vertical axis is a processing time ms for each repetition. In FIG. 11, reference numeral g451 denotes a result of the AuxIVA-IP algorithm according to the comparative example, and reference numeral g452 denotes a result of the ISS algorithm according to the present embodiment. In the experiment, one to 17 sound sources were confirmed. Note that the simulation was performed on a workstation equipped with a central processing unit (CPU) having a clock frequency of 3.3 GHz and 10 cores. The results of FIG. 11 shows an average execution time of one repetition.

As illustrated in FIG. 11, in the ISS algorithm according to the present embodiment, a time required for an arithmetic operation decreases as the number of sound sources increases, as compared with the comparative example. That is, in the ISS algorithm according to the present embodiment, an arithmetic operation cost can be more reduced than in the AuxIVA-IP algorithm according to the comparative example.

As described above, in the present embodiment, iterative source steering for independent vector analysis based on an auxiliary function method has been introduced for sound source separation. Decoding vectors are updated alternately in the AuxIVA-IP algorithm according to the comparative example, while updating based on elementary row operation is continuously performed in the algorithm according to the present embodiment. Thereby, the technique in the present embodiment can obtain an update rule having no inverse matrix and a low degree of calculation complexity, can increase stability and speed, and is ideal for important practical implementation. In the technique in the present embodiment, a steering vector of a certain sound source is updated by an amount proportional to the projection of residual noise of another sound source into a sound source partial space.

From simulation results, it was confirmed that the technique according to the present embodiment was efficient for sound source separation, and it was confirmed that the calculation cost could be reduced.

Note that the above-mentioned sound recognition method, program, and sound recognition device can also be applied to a sound recognition system, a remote conference system, a WEB conference system, a smart speaker, a sound input interface for home appliances, a hearing aid, robot hearing, and the like.

Note that all or some of processes performed by the sound source separation unit 12 may be performed by recording a program for realizing all or some of the functions of the sound source separation unit 12 in the present invention on a computer-readable recording medium and causing a computer system to read and execute the program recorded on the recording medium. Note that it is assumed that the "computer system" mentioned here includes hardware such as an OS and peripheral devices. Further, it is assumed that the "computer system" also includes a WWW system provided with a homepage providing environment (or display environment). In addition, the "computer-readable recording medium" is a portable medium such as a flexible disk, a magneto-optical disc, a ROM, or a CD-ROM, and a storage device such as a hard disk built into the computer system. Further, it is assumed that the "computer-readable recording medium" includes a medium that stores a program for a fixed period of time, such as a volatile memory (RAM) inside a computer system which serves as a server or a client when the program is transmitted via a network such as the Internet or a communication line such as a telephone line.

Further, the above-mentioned program may be transmitted from a computer system in which the program is stored in a storage device or the like to another computer system via a transmission medium or by a transmission wave in the transmission medium. Here, the "transmission medium" for transmitting the program is a medium having a function of transmitting information, such as a network (communication network) such as the Internet or a communication line such as a telephone line. In addition, the above-mentioned program may be for realizing some of the above-mentioned functions. Further, the above-mentioned program may be a so-called difference file (difference program) that can realize the above-mentioned functions in combination with a program already recorded in the computer system.

Although a mode for carrying out the present invention has been described above using the embodiment, the present invention is not limited to the embodiment, and various modifications and substitutions can be made without departing from the scope of the present invention.

EXPLANATION OF REFERENCES

1 Sound source separation device
11 Acquisition unit
12 Sound source separation unit
13 Output unit
121 STFT unit
122 Separation unit
123 Inverse STFT unit

What is claimed is:

1. A computer-readable non-transitory storage medium storing a sound source separation program that causes a computer to:

acquire an acoustic signal, convert the acquired acoustic signal from a time region to a frequency region, and perform sound source separation on the acoustic signal converted to the frequency region by performing updating based on elementary row operation on a demixing matrix to iteratively minimize an objective function including a quadratic form of a separation vector and a determinant of the demixing matrix, wherein the program causes the computer to:

perform updating by a conversion formula based on the elementary row operation of the following formula for each frequency f and when k=1, . . . , M:

$$W_f \leftarrow W_f - v_{kf} w_{kf}^H, \text{ and}$$

calculate an unknown vector $V_{kf}=(V_1, \ldots, V_M)^T$ (T represents vector transpose, k is a number of a sound source signal and is an integer from 1 to the number of microphones M, and f is an index representing a frequency) by finding a vector for minimizing the objective function, wherein $W_f=(W_{1f}, \ldots, W_{Kf})^H$ is a demixing matrix, H is the Hermitian transpose, K is the number of sound sources, M is the number of microphones that collect the acoustic signal, and K=M.

2. The computer-readable non-transitory storage medium according to claim 1, wherein the program causes the computer to perform updating by multiplying the demixing matrix $W_f$ by a matrix in which a kth column is determined so as to minimize the function and other columns other than the kth column are unit columns, for each frequency f and repeat the updating processing to obtain the demixing matrix $W_f$.

3. The computer-readable non-transitory storage medium according to claim 1, wherein the function is shown in the following formula:

$$Q = \sum_{f=1}^{F} \sum_{k=1}^{M} w_{kf}^H V_{kf} w_{kf} - 2 \sum_{f=1}^{F} \log|\det(W_f)|$$

the demixing matrix $W_f$ is $(w_{1f}, \ldots, W_{Kf})^H$, F is a total number of frequencies, H is the Hermitian transpose, and $V_{kf}$ is the weighted covariance matrix.

4. A sound source separation method comprising:

acquiring an acoustic signal by a sound collecting unit including a plurality of microphones;

converting the acquired acoustic signal from a time region to a frequency region by a sound separation unit; and performing sound separation on the acoustic signal converted to the frequency region by the sound source separation unit, the sound separation being performed by performing updating based on elementary row operation on a demixing matrix to iteratively minimize an objective function including a quadratic form of a separation vector and a determinant of the demixing matrix;

wherein the sound source separation method further comprises:

performing updating by a conversion formula based on the elementary row operation of the following formula for each frequency f and when k=1, . . . , M:

$$W_f \leftarrow W_f - v_{kf} w_{kf}^H, \text{ and}$$

calculating an unknown vector $V_{kf}=(v_1, \ldots, V_M)^T$ (T represents vector transpose, k is a number of a sound source signal and is an integer from 1 to the number of microphones M, and f is an index representing a frequency) by finding a vector for minimizing the objective function, wherein $W_f=(W_{1f}, \ldots, W_{Kf})^H$ is a demixing matrix, H is the Hermitian transpose, K is the number of sound sources, M is the number of microphones that collect the acoustic signal, and K=M.

5. A sound source separation device comprising:

a sound collecting unit that includes a plurality of microphones that acquire an acoustic signal; and a sound source separation unit that converts the acquired acoustic signal from a time region to a frequency region, and performs sound source separation on the acoustic signal converted to the frequency region by performing updating based on elementary row operation on a demixing matrix to iteratively minimize an objective function including a quadratic form of a separation vector and a determinant of the demixing matrix;

wherein the sound source separation unit:

performs updating by a conversion formula based on the elementary row operation of the following formula for each frequency f and when k=1, . . . , M:

$$W_f \leftarrow W_f - v_{kf} w_{kf}^H, \text{ and}$$

calculates an unknown vector $V_{kf}=(V_1, \ldots, V_M)^T$ (T represents vector transpose, k is a number of a sound source signal and is an integer from 1 to the number of microphones M, and f is an index representing a frequency) by finding a vector for minimizing the objective function, wherein $W_f=(w_{1f}, \ldots, W_{Kf})^H$ is a demixing matrix, H is the Hermitian transpose, K is the number of sound sources, M is the number of microphones that collect the acoustic signal, and K=M.

* * * * *